United States Patent
Woo et al.

(10) Patent No.: US 11,208,526 B2
(45) Date of Patent: *Dec. 28, 2021

(54) CURABLE COMPOSITION

(71) Applicant: LG Chem, Ltd., Seoul (KR)

(72) Inventors: Dong Hyun Woo, Daejeon (KR); Seung Min Lee, Daejeon (KR); Se Woo Yang, Daejeon (KR)

(73) Assignee: LG Chem, Ltd.

( * ) Notice: Subject to any disclaimer, the term of this patent is extended or adjusted under 35 U.S.C. 154(b) by 96 days.

This patent is subject to a terminal disclaimer.

(21) Appl. No.: 16/463,163

(22) PCT Filed: Nov. 24, 2017

(86) PCT No.: PCT/KR2017/013556
§ 371 (c)(1),
(2) Date: May 22, 2019

(87) PCT Pub. No.: WO2018/097663
PCT Pub. Date: May 31, 2018

(65) Prior Publication Data
US 2019/0276587 A1  Sep. 12, 2019

(30) Foreign Application Priority Data
Nov. 25, 2016 (KR) .................. 10-2016-0158599

(51) Int. Cl.
*C08G 59/24* (2006.01)
*C08G 59/06* (2006.01)
(Continued)

(52) U.S. Cl.
CPC .......... *C08G 59/245* (2013.01); *C08G 59/06* (2013.01); *C08G 59/5073* (2013.01);
(Continued)

(58) Field of Classification Search
CPC .. C08G 59/06; C08G 59/245; C08G 59/5073; C08G 59/621; C08G 59/687;
(Continued)

(56) References Cited

U.S. PATENT DOCUMENTS 5,086,086 A    2/1992   Brown-Wensley et al.
5,252,694 A   10/1993   Willett et al.
(Continued)

FOREIGN PATENT DOCUMENTS

CN   1989164 A    6/2007
JP   H04261421 A  9/1992
(Continued)

OTHER PUBLICATIONS

International Search Report for Application No. PCT/KR2017/013556 dated Mar. 12, 2018, 2 pages.
(Continued)

*Primary Examiner* — Eli D. Strah
(74) *Attorney, Agent, or Firm* — Lerner, David, Littenberg, Krumholz & Mentlik, LLP

(57) ABSTRACT

The present application relates to a curable composition. The curable composition of the present application exhibits excellent adhesion ability and liquid crystal orientation ability simultaneously before or after curing, so that it can be effectively applied to various optical uses.

12 Claims, 1 Drawing Sheet

(51) Int. Cl.

| | | |
|---|---|---|
| *C08L 63/00* | (2006.01) | |
| *C09J 163/00* | (2006.01) | |
| *C08G 59/62* | (2006.01) | |
| *C08G 59/68* | (2006.01) | |
| *C09J 7/00* | (2018.01) | |
| *C08G 59/50* | (2006.01) | |
| *G02F 1/1335* | (2006.01) | |

(52) U.S. Cl.
CPC ......... *C08G 59/621* (2013.01); *C08G 59/687* (2013.01); *C08L 63/00* (2013.01); *C09J 7/00* (2013.01); *C09J 163/00* (2013.01); *B32B 2457/20* (2013.01); *B32B 2457/202* (2013.01); *C08G 2650/56* (2013.01); *C09J 2203/318* (2013.01); *C09J 2433/00* (2013.01); *C09J 2463/00* (2013.01); *C09K 2323/00* (2020.08); *C09K 2323/03* (2020.08); *C09K 2323/035* (2020.08); *C09K 2323/05* (2020.08); *C09K 2323/055* (2020.08); *C09K 2323/057* (2020.08); *G02F 1/133526* (2013.01); *G02F 2202/28* (2013.01)

(58) Field of Classification Search
CPC .............. C08G 2650/56; C08G 59/063; C08G 59/4223; C08L 63/00; C09J 7/00; C09J 163/00; C09J 2203/318; C09J 2433/00; C09J 2463/00; C09K 2323/00; C09K 2323/03; C09K 2323/035; C09K 2323/05; C09K 2323/055; C09K 2323/057; G02F 1/133526; G02F 2202/28; B32B 2457/20; B32B 2457/202
See application file for complete search history.

(56) References Cited

U.S. PATENT DOCUMENTS

| | | | |
|---|---|---|---|
| 5,897,727 | A | 4/1999 | Staral et al. |
| 6,180,200 | B1 | 1/2001 | Ha et al. |
| 8,921,445 | B2 | 12/2014 | Turshani et al. |
| 2009/0131550 | A1 | 5/2009 | Arai et al. |
| 2009/0197020 | A1* | 8/2009 | Kim .......................... C08J 5/18 428/1.31 |
| 2014/0235758 | A1 | 8/2014 | Cheng et al. |
| 2014/0243453 | A1 | 8/2014 | Mizumura et al. |
| 2015/0083975 | A1 | 3/2015 | Yeou et al. |
| 2017/0198182 | A1* | 7/2017 | Kim ..................... B32B 15/082 |
| 2017/0233610 | A1* | 8/2017 | Kim ..................... B32B 27/306 428/220 |
| 2019/0276719 | A1* | 9/2019 | Lee ........................ C09J 163/10 |

FOREIGN PATENT DOCUMENTS

| | | | |
|---|---|---|---|
| JP | H08328026 | A | 12/1996 |
| JP | H11508301 | A | 7/1999 |
| JP | 2002338900 | A | 11/2002 |
| JP | 2004302272 | A | 10/2004 |
| JP | 2005222037 | A | 8/2005 |
| JP | 2007199710 | A | 8/2007 |
| JP | 2008112137 | A | 5/2008 |
| JP | 2011219682 | A | 11/2011 |
| JP | 2016122178 | A | 7/2016 |
| JP | 2016145865 | A | 8/2016 |
| KR | 20070044029 | A | 4/2007 |
| KR | 20090021797 | A | 3/2009 |
| KR | 101158316 | B1 | 6/2012 |
| KR | 101202370 | B1 | 11/2012 |
| KR | 20140067087 | A | 6/2014 |
| KR | 20140092362 | A | 7/2014 |
| KR | 101462845 | B1 | 11/2014 |
| KR | 20140147923 | A | 12/2014 |
| KR | 20160025157 | A | 3/2016 |
| KR | 20160050423 | A | 5/2016 |
| WO | 9700923 | A1 | 1/1997 |
| WO | WO-2006009308 | A1 * | 1/2006 ......... C08G 59/1466 |
| WO | 2009145167 | A1 | 12/2009 |
| WO | WO-2016175611 | A1 * | 11/2016 ........... B32B 27/281 |
| WO | WO-2016175612 | A1 * | 11/2016 ........... B32B 15/082 |

OTHER PUBLICATIONS

Chinese Search Report for Application No. 201780055695.5 dated Sep. 29, 2020, 2 pages.
Triiso, "Kukdo Epoxy Brochure", Beyond Expectation & Beyond Limitation, Jul. 2021, pp. 1-27. URL: https://www.tri-iso.com/documents/Kukdo_Epoxy_Brochure.pdf.

* cited by examiner

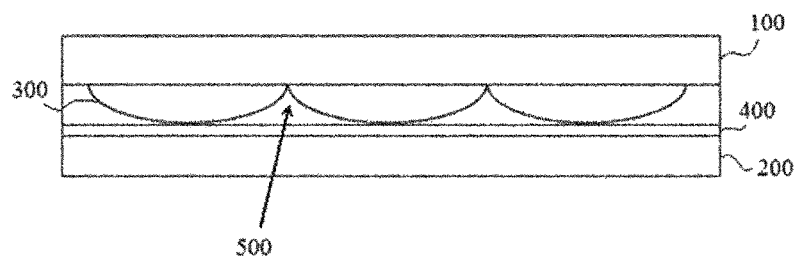

CURABLE COMPOSITION

CROSS-REFERENCE TO RELATED APPLICATIONS

The present application is a national phase entry under 35 U.S.C. § 371 of International Application No. PCT/KR2017/013556 filed Nov. 24, 2017, which claims priority from Korean Patent Application No. 10-2016-0158599 filed Nov. 25, 2016, all of which are incorporated herein by reference.

TECHNICAL FIELD

The present application relates to a curable composition.

BACKGROUND ART

For driving a device using liquid crystals such as an LCD (liquid crystal display), optical anisotropy and polarization property of liquid crystals are used. In such a device, an alignment film is usually used, which determines the initial alignment of the liquid crystals.

In some cases, the alignment layer as above may be required to have adhesion performance in addition to orientation ability to the liquid crystals. A representative example of such a case is a 3D display device (3-dimensional display), in particular an auto-stereoscopic 3D display device.

Such a display device comprises, for example, a unit element configured as in the FIGURE. The unit element of the FIGURE comprises two substrates (100, 200) (generally, substrate on which an electrode layer such as an ITO (indium tin oxide) electrode layer is formed as an electrode layer for driving liquid crystals) disposed opposite to each other, where lenses (300) are present on any one substrate of them and an alignment film (400) is present on the surface of the substrate (200) disposed opposite to the substrate (100) on which the lenses (300) exist. And, liquid crystals exist in spaces (500) formed between the alignment film (400) and the lenses (300), where since the lenses (300) and the alignment film (400) contact, it may be required that the alignment film (400) has adhesion ability to the lenses (300).

In addition to the configuration of the auto-stereoscopic 3D device as above, there are various fields that are required to have liquid crystal orientation ability and adhesion ability simultaneously.

DISCLOSURE

Technical Problem

The present application relates to a curable composition. The curable composition of the present application may be an adhesive composition, that is, a composition which is cured to act as an adhesive, and this adhesive composition may form an adhesive exhibiting liquid crystal orientation ability. In one example, the curable composition of the present application may be a liquid crystal orientational adhesive composition.

Technical Solution

The curable composition of the present application comprises an epoxy compound and a bisphenol type (meth) acrylate.

In the present application, the term epoxy compound is a compound having at least one epoxide functional group, which means a compound capable of exhibiting adhesion performance before or after curing. In some cases, a phenoxy compound or phenoxy resin to be described below is also classified as the epoxy compound, but the phenoxy compound is excluded in the epoxy compound mentioned herein.

The kind of the epoxy compound applicable in the present application is not particularly limited as long as it can exhibit the adhesion performance before or after curing as above, and for example, a monomer, a macromonomer, a polymer and/or a mixture thereof, containing an epoxide group which may be aliphatic, alicyclic or aromatic, may be exemplified, where these epoxy compounds are often also simply called epoxy resins. The epoxy compounds as above may each have at least one epoxide functional group, and generally have two or more epoxide functional groups. According to one example, in the present application, an epoxy resin having a weight average molecular weight in a range of about 300 to 10,000 can be used.

For example, as the epoxy compound, one or more selected from the group known as a bisphenol A type epoxy resin, a bisphenol F type epoxy resin, a novolac type epoxy resin, a DCPD (dicyclopentadiene) type epoxy resin, a silane modified epoxy resin or a hydrogenated bisphenol A type epoxy resin may be applied. In one example, as the epoxy compound, a bisphenol A type epoxy resin or a bisphenol F type epoxy resin; or a multifunctional epoxy resin having two or more functional groups such as a cresol novolac epoxy resin, a phenol novolac epoxy resin, a tetrafunctional epoxy resin, a biphenyl type epoxy resin, a triphenolmethane type epoxy resin, an alkyl modified triphenolmethane type epoxy resin, a naphthalene type epoxy resin or a dicyclopentadiene modified phenol type epoxy resin, and the like can be used, without being limited thereto. For example, a silane modified epoxy compound or a hydrogenated bisphenol A type epoxy resin, and the like may be applied in addition to the above-mentioned kinds. Such an epoxy compound may be a solid or liquid phase at room temperature.

Such an epoxy compound may be present in the curable composition in a ratio of about 10 wt % or more. In another example, the ratio of the epoxy compound may be about 15 wt % or more, or about 20 wt % or more, or may be about 90 wt % or less, 85 wt % or less, 80 wt % or less, 75 wt % or less, 70 wt % or less, 65 wt % or less, 60 wt % or less, 55 wt % or less, 50 wt % or less, 45 wt % or less, or 40 wt % or less or so. Here, when the curable composition comprises a solvent, the ratio of the epoxy compound in the curable composition is based on the total weight excluding the weight of the solvent, which is a ratio, for example, in the case of adding the monomer, oligomer, resin component, initiator component and other additive components, present in the curable composition, up to 100 wt %.

In the curable composition of the present application, the above-described various kinds of compounds can be used as the epoxy compound, and considering the orientation ability of the liquid crystals, a bisphenol type epoxy compound, such as a bisphenol A type or bisphenol F type epoxy compound, can be used.

In one example, the bisphenol type epoxy compound may be applied by a mixture of an epoxy compound, which is a solid or semi-solid phase, and a liquid epoxy compound. Here, the standard of the solid, semi-solid or liquid phase is based on the state at room temperature and normal pressure state.

In the present application, the term room temperature is a natural temperature without warming or cooling, and may mean, for example, any one temperature within a range of about 10° C. to 30° C., or a temperature of 25° C. or 23° C. or so.

In the present application, the term normal pressure is a pressure when the pressure is not particularly reduced or increased, and may be usually about one atmosphere, such as atmospheric pressure.

In one example, as the solid or semi-solid epoxy compound, a bisphenol type epoxy compound having a softening point or melting point of 50° C. or more, for example, a bisphenol A type epoxy compound can be applied. The epoxy compound exists as a solid or semi-solid phase at room temperature/normal pressure by the softening point or melting point of the epoxy compound as above. In another example, the softening point or melting point may be about 55° C. or more, or 60° C. or more and may be 200° C. or less, 190° C. or less, 180° C. or less, 170° C. or less, 160° C. or less, 150° C. or less, 130° C. or less, 120° C. or less, 110° C. or less, 100° C. or less, 90° C. or less, or 80° C. or less.

As the solid or semi-solid epoxy compound, a bisphenol type epoxy compound having an epoxy equivalent weight of 180 g/eq to about 1,000 g/eq or about 150 g/eq or more can be applied. In another example, the epoxy equivalent may be about 200 g/eq or more, 250 g/eq or more, 300 g/eq or more, about 350 g/eq or more, or about 400 g/eq or more, and may be about 4,000 g/eq or less, about 3,500 g/eq or less, about 3,000 g/eq or less, about 2,500 g/eq or less, about 2,000 g/eq or less, about 1,500 g/eq or less, about 1,000 g/eq or less, about 900 g/eq or less, about 800 g/eq or less, about 700 g/eq or less, or about 600 g/eq or less.

In the field of adhesives, epoxy compounds having the above characteristics are variously known, and for example, a compound commercially available from DIC Company under the name of EPICLON 1050, 1055, 2050, 3050, 4050, 7050, HM-091 or HM-101, and the like, or a compound commercially available from Kukdo Chemical Co., Ltd. under the name of YD-020, YD-020L, YD-019K, YD-019, YD-017H, YD-017R, YD-017, YD-014, YD-014ER or YD-013K may be used.

The solid or semi-solid epoxy compound as above may exist in the curable composition in a ratio of about 10 wt % or more, about 15 wt % or more, about 20 wt % or more, about 25 wt % or more, about 30 wt % or more, about 35 wt % or more, about 40 wt % or more, about 45 wt % or more, or about 50 wt % or more, or may exist in a ratio of about 90 wt % or less, 85 wt % or less, or about 80 wt % or less, based on 100 wt % of the total epoxy compound.

A liquid bisphenol type epoxy compound, for example, a liquid bisphenol A type epoxy compound, which can be applied together with the solid or semi-solid epoxy compound as above, is an epoxy compound having a melting point lower than room temperature, where the epoxy compound may exist in a liquid phase at normal temperature/normal pressure by such a melting point.

In another example, the liquid epoxy compound may be a compound having a viscosity of about 20,000 cP or less at room temperature (about 25° C.) measured according to ASTM D2196-05 or KD-AS-005. In another example, the viscosity may be about 18,000 cP or less, about 16,000 cP or less, about 14,000 cP or less, about 12,000 cP or less, about 10,000 cP or less, about 8,000 cP or less, about 6,000 cP or less, about 4,000 cP or less, about 2,000 cP or less, about 1,900 cP or less, about 1,800 cP or less, about 1,700 cP or less, about 1,600 cP or less, about 1,500 cP or less, or about 1,450 cP or less, and may be about 500 cP or more, about 600 cP or more, about 700 cP or more, about 800 cP or more, about 900 cP or more, or about 1,000 cP or more.

As the liquid epoxy compound, a bisphenol type epoxy compound having an epoxy equivalent weight of 180 g/eq to about 1,000 g/eq, or about 300 g/eq or less can be applied. In another example, the epoxy equivalent weight may be about 280 g/eq or less, 260 g/eq or less, 240 g/eq or less, 220 g/eq or less, or 200 g/eq or less, and may be about 50 g/eq or more, about 70 g/eq or more, about 90 g/eq or more, about 110 g/eq or more, about 130 g/eq or more, or about 150 g/eq or more.

In the field of adhesives, epoxy compound having the above characteristics are variously known, and for example, a compound commercially available from Kukdo Chemical Co., Ltd. under the name of YD-128SH, YD-128SM, YD-128S, YD-128H, YD-128M, YD-128A, YD-128, YD-127, YD-2209 or YD-119 128S may be used.

The liquid epoxy compound may be included in the curable composition in a ratio of about 10 to 200 parts by weight relative to 100 parts by weight of the solid or semi-solid epoxy compound. In another example, the ratio may be about 15 parts by weight or more, 20 parts by weight or more, 25 parts by weight or more, 30 parts by weight or more, or 35 parts by weight or more, and may be about 180 parts by weight or less, about 160 parts by weight or less, about 140 parts by weight or less, about 130 parts by weight or less, about 120 parts by weight or less, about 110 parts by weight or less, about 100 parts by weight or less, or about 90 parts by weight or less.

The curable composition of the present application comprises a bisphenol type (meth)acrylate, for example, bisphenol A (meth)acrylate together with the above epoxy compound. Here, the bisphenol type (meth)acrylate means a compound having a bisphenol framework (for example, bisphenol A framework), where at least 1 or more, 2 or more, 2 to 10, 2 to 8, 2 to 6, 2 to 4 or 2 to 3 (meth)acrylic series functional groups, for example, (meth)acryloyl groups are linked to the framework. At this time, the compound may be linked to the bisphenol framework directly or by an appropriate linker.

In this specification, the term (meth)acrylic means methacrylic or acrylic.

As such a compound, for example, a compound represented by Formula 1 below can be exemplified.

[Formula 1]

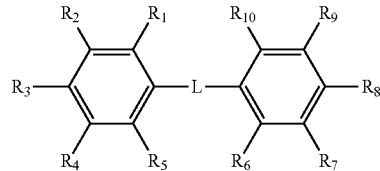

In Formula 1, L is an alkylene group or alkylidene group having 1 to 8 carbon atoms, and $R_1$ to $R_{10}$ are each independently hydrogen, halogen, an alkyl group, an alkoxy group, a cyano group, a nitro group, $-(O-A)_n-R$, $-(A-O)_n-R$, $-(O-A-O)_n-R$, a (meth)acryloyl group, a (meth)acryloyloxy group, a (meth)acryloyloxyalkyl group or a (meth)acryloyloxyalkyloxy group, where A is an alkylene group, R is a (meth)acryloyl group or a (meth)acryloyloxy group, n is a number in a range of 1 to 10, and at least one of $R_1$ to $R_{10}$ is $-(O-A)_n-R$, $-(A-O)_n-R$, $-(O-A-O)_n-R$, a (meth)acryloyl group, a (meth)acryloyloxy group, a (meth)acryloyloxyalkyl group or a (meth)acryloyloxyalkyloxy group.

In another example, L in Formula 1 may be an alkylene group or alkylidene group having 1 to 6 carbon atoms, 1 to 4 carbon atoms, 1 to 3 carbon atoms, or 3 carbon atoms.

Also, as the halogen in Formula 1, a fluorine or chlorine atom can be exemplified.

Furthermore, the alkylene group of A in Formula 1 may be, for example, an alkylene group having 1 to 20 carbon atoms, 1 to 16 carbon atoms, 1 to 12 carbon atoms, 1 to 8 carbon atoms, or 1 to 4 carbon atoms, where this functional group may be linear, branched or cyclic, and may also be optionally substituted with one or more substituents, if necessary.

In addition, the alkyl group or alkoxy group in Formula 1 may be, for example, an alkyl group or alkoxy group having 1 to 20 carbon atoms, 1 to 16 carbon atoms, 1 to 12 carbon atoms, 1 to 8 carbon atoms or 1 to 4 carbon atoms, where this functional group may be linear, branched or cyclic, and may be optionally substituted with one or more substituents, if necessary.

Also, in another example, n in Formula 1 may be 2 or more, 3 or more, 4 or more, 5 or more, 6 or more, 7 or more, 8 or more, or 9 or more, or may be 9 or less, 8 or less, 7 or less, 6 or less, 5 or less, 4 or less, 3 or less, or 2 or less.

Furthermore, at least 1 or more, 2 or more, 2 to 10, 2 to 8, 2 to 6, 2 to 4, 2 to 3 or 2 of $R_1$ to $R_{10}$ in Formula 1 may be any one selected from the group consisting of —(O-A)$_n$-R, -(A-O)$_n$—R, —(O-A-O)$_n$—R, a (meth)acryloyl group, a (meth)acryloyloxy group, a (meth)acryloyloxyalkyl group and a (meth)acryloyloxyalkyloxy group, where at least $R_3$ and $R_8$ may be any one selected from the above —(O-A)$_n$-R, -(A-O)$_n$—R, —(O-A-O)$_n$—R, (meth)acryloyl group, (meth)acryloyloxy group, (meth)acryloyloxyalkyl group and (meth)acryloyloxyalkyloxy group.

Such a compound can be exemplified by a liquid bisphenol A epoxy acrylate (CN110NS) from Sartomer, or the like, but is not limited thereto.

The bisphenol type (meth)acrylate may be included in the curable composition in a ratio of about 100 parts by weight or less, less than 100 parts by weight, 90 parts by weight or less, 80 parts by weight or less, 70 parts by weight or less, or 65 parts by weight or less, relative to 100 parts by weight of the epoxy compound. If the ratio of the compound is too much excessive, there are problems that hardness is insufficient in the primary curing process of the curing layer forming process to be described below to lower liquid crystal orientation and fluidity is excessively increased at the secondary curing, and thus it is suitable to be controlled to the above ratio. The lower limit of the ratio of the bisphenol type (meth)acrylate is not particularly limited, and for example, may be about 1 part by weight or more, about 5 parts by weight or more, about 10 parts by weight or more, about 15 parts by weight or more, about 20 parts by weight or more, about 25 parts by weight or more, about 30 parts by weight or more, about 35 parts by weight or more, about 40 parts by weight or more, about 45 parts by weight or more, or about 50 parts by weight or more, relative to 100 parts by weight of the epoxy compound.

The curable composition may comprise, as an additional component, a phenoxy resin. Such a phenoxy resin can be introduced in an appropriate amount in consideration of coatability, hardness, liquid crystal orientation ability and adhesion ability of the composition.

As the phenoxy resin, a bisphenol A type phenoxy resin, a bisphenol F type phenoxy resin, a bisphenol AF type phenoxy resin, a bisphenol S type phenoxy resin, a brominated bisphenol A type phenoxy resin, a brominated bisphenol F type phenoxy resin, a phosphorus-containing phenoxy resin, or a mixture of two or more of the foregoing can be used.

It is appropriate to use a bisphenol type phenoxy resin as the phenoxy resin in consideration of the liquid crystal orientation ability and the like.

In addition, as the phenoxy resin, a resin having a weight average molecular weight of about 30,000 to 150,000 g/mol can be used. In the present application, the term weight average molecular weight is a value in terms of standard polystyrene measured by GPC (gel permeation chromatograph), which may also be simply called molecular weight, unless otherwise specified. In another example, the molecular weight of the phenoxy resin may be about 35,000 g/mol or more, 40,000 g/mol or more, or 45,000 g/mol or more, or may be 140,000 g/mol or less, 130,000 g/mol or less, 120,000 g/mol or less, 100,000 g/mol or less, 90,000 g/mol or less, or 80,000 g/mol or less.

The phenoxy resin may be included in the curable composition in a ratio of about 500 parts by weight or less, 450 parts by weight or less, 400 parts by weight or less, 350 parts by weight or less, 300 parts by weight or 250 parts by weight or less relative to 100 parts by weight of the epoxy compound. If the ratio of the compound is too much excessive, the adhesive force of the cured layer of the curable composition may be deteriorated, so that it is appropriate to be controlled to the above ratio. The lower limit of the ratio of the phenoxy resin can be adjusted in consideration of coatability, hardness and liquid crystal orientation ability, and for example, may be about 10 parts by weight or more, about 20 parts by weight about 30 parts by weight or more, about 40 parts by weight or more, about 50 parts by weight or more, about 60 parts by weight or more, about 70 parts by weight or more, about 75 parts by weight or more, or about 80 parts by weight or more, relative to 100 parts by weight of the epoxy compound.

The curable composition may comprise a curing agent in addition to the above components. Such a curing agent may be, for example, a curing agent capable of curing the epoxy compound, and may be a heat curing agent, that is, a component capable of curing the epoxy compound by application of heat.

Various curing agents capable of curing the epoxy compound are known in the art, and in the present application, such curing agents can be used without limitation. For example, as the curing agent, a curing agent known as a phenol-based curing agent, a triphenylphosphine curing agent, an amine-based curing agent, an acid anhydride-based curing agent, an isocyanate-based curing agent, an imidazole-based curing agent or a mercaptan-based curing agent can be used.

The ratio of the curing agent in the curable composition is not particularly limited as long as adequate curing of the epoxy compound can occur, and for example, may be about 0.5 parts by weight or more, 1 part by weight or more, 1.5 parts by weight or more, or 2 parts by weight or more can be used relative to 100 parts by weight of the epoxy compound, and the upper limit may be about 15 parts by weight or less, 13 parts by weight or less, 11 parts by weight or less, 10 parts by weight or less, 9 parts by weight or less, 8 parts by weight or less, 7 parts by weight or less, or 5 parts by weight or less.

The curable composition may also comprise a cationic initiator for curing the epoxy compound with or in place of the curing agent. In one example, the curable composition may not comprise a curing agent, but may comprise a cationic initiator.

As the cationic initiator, a general photo cationic initiator or a thermal cationic initiator known to be capable of inducing a cationic curing reaction of the epoxy compound can be applied. For example, as the cationic initiator, for example, an onium salt, a specific organometallic complex, etc., and a mixture thereof, and the like are included. Descriptions of exemplary organometallic complexes and their use in conjunction with a number of epoxy compounds can be found, for example, in U.S. Pat. No. 5,252,694 (Willett et al.), U.S. Pat. No. 5,897,727 (Staral et al.) and U.S. Pat. No. 6,180,200 (Ha et al.), and the like, the disclosures of which are incorporated herein by reference.

Useful onium salts include those having a formula AX, wherein A is an organic cation (e.g., selected from diazonium, iodonium and sulfonium cations; preferably, selected from diphenyliodonium, triphenylsulfonium, and phenylthiophenyldiphenylsulfonium), and X is an anion (e.g., an organic sulfonate or a halogenated metal or metalloid). A particularly useful onium salt includes an aryldiazonium salt, a diaryliodonium salt, and a triarylsulfonium salt, but is not limited thereto. As additional examples of useful onium salts, those described in U.S. Pat. No. 5,086,086 (Brown-Wensley et al.) (e.g., Column 4, 29 to 61 lines) are included, the disclosure of which is incorporated herein by reference.

The ratio of the cationic initiator in the curable composition is not particularly limited as long as suitable polymerization of the epoxy compound is possible, and for example, about 0.5 parts by weight or more, 1 part by weight or more, 1.5 parts by weight or more, 2 parts by weight or more, 2.5 parts by weight or more, 3 parts by weight or more, 3.5 parts by weight or more, 4 parts by weight or more, or 4.5 parts by weight or more may be used relative to 100 parts by weight of the epoxy compound and the upper limit may be about 50 parts by weight or less, 45 parts by weight or less, 40 parts by weight or less, 35 parts by weight or less, 30 parts by weight or less, 25 parts by weight or less, 20 parts by weight or less, 15 parts by weight or less, 10 parts by weight, or 5 parts by weight or less.

The curable composition may further comprise a radical initiator, for example, a photo radical initiator or a thermal radical initiator, as a component for curing the (meth)acrylate.

Radical initiators useful in curing the (meth)acrylate compound are widely known, and for example, a photoradical initiator such as benzoin ethers (for example, benzoin methyl ether and benzoin isopropyl ether), substituted benzoin ethers (for example, anisoin methyl ether), substituted acetophenones (for example, 2,2-diethoxyacetophenone and 2,2-dimethoxy-2-phenylacetophenone), substituted alpha-ketol (for example, 2-methyl-2-hydroxypropiophenone), aromatic phosphine oxides (for example bis(2,4,6-trimethylbenzoyl) phenylphosphine oxide), aromatic sulfonyl chlorides (for example, 2-naphthalene-sulfonyl chloride) and/or photoactive oximes (for example, 1-phenyl-1,2-propandion-2(O-ethoxycarbonyl)oxime), or a thermal radical initiator such as (1) azo compounds, for example, 2,2'-azo-bis(isobutyronitrile), dimethyl 2,2'-azo-bis(isobutyrate), azo-bis(diphenylmethane), and 4,4'-azo-bis(4-cyanopentanoic acid); (2) peroxides, for example, hydrogen peroxide, benzoyl peroxide, cumyl peroxide, tert-butyl peroxide, cyclohexanone peroxide, glutaric acid peroxide, lauroyl peroxide, and methyl ethyl ketone peroxide; (3) hydroperoxides, for example, tert-butyl hydroperoxide and cumene hydroperoxide; (4) peracids, for example, peracetic acid, perbenzoic acid, potassium persulfate and ammonium persulfate; (5) peresters, for example, diisopropyl percarbonate; and/or (6) a thermal redox initiator, and the like can be used.

The ratio of the radical initiator in the curable composition is not particularly limited as long as the proper polymerization of the (meth)acrylate compound is possible, and for example, about 0.5 parts by weight or more, 1 part by weight or more, 1.5 parts by weight or more, 2 parts by weight or more, 2.5 parts by weight or more, 3 parts by weight or more, 3.5 parts by weight or more, 4 parts by weight or more, or 4.5 parts by weight or more may be used relative to 100 parts by weight of the bisphenol type (meth) acrylate, and the upper limit may be about 50 parts by weight or less, 45 parts by weight or less, 40 parts by weight or less, 35 parts by weight or less, 30 parts by weight or less, or 25 parts by weight or less.

The present application also relates to a method for forming a cured layer, for example, an adhesive layer having liquid crystal orientation ability using the curable composition as above, and to the adhesive layer. In the present application, the adhesive layer having liquid crystal orientation ability may comprise a cured product of the above-mentioned curable composition.

The adhesive layer may comprise, for example, steps of drying a film formed using the curable composition; rubbing the film after heat treatment; inducing curing of the epoxy compound and/or (meth)acrylate in the film after the rubbing, and heat-treating (aging) the film after curing induction. In the above process, the liquid crystal orientation ability is imparted to the adhesive layer by the rubbing, and the adhesive force can be increased by the curing and heat treatment reaction.

For example, the method may comprise steps of: performing an orientation treatment on the layer of the curable composition; curing the layer of the curable composition on which the orientation treatment has been performed and heat treating the layer of the curable composition after the curing treatment.

Here, the layer of the curable composition may be formed, for example, by coating and drying the curable composition to an appropriate thickness.

In this case, the thickness of the coating, that is, the thickness of the layer of the curable composition is not particularly limited, but may be in a range of, for example, about 1 μm to 50 μm.

Here, the orientation treatment method performed in the above is not particularly limited, which can be performed in consideration of the intended orientation direction by applying, for example, a generally known rubbing orientation method or the like.

After the orientation treatment, the curing and heat treatment (aging) processes are performed, whereby a layer having a desired liquid crystal orientation ability and adhesion ability can be formed. If necessary, the curing and heat treatment can be performed in a state where the layer of the curable composition is in contact with another member requiring adhesion after the orientation treatment.

Here, the heat treatment may be performed, for example, at a temperature in a range of about 50° C. to 100° C. Also, the heat treatment may be performed for about 10 minutes to 100 minutes, and in another example, the time of performing the heat treatment may be about 90 minutes or less, about 80 minutes or less, about 70 minutes or less, or about 60 minutes or less. Through the heat treatment under such conditions, a layer of the curable composition having excellent liquid crystal orientation ability and adhesion can be formed.

On the other hand, the condition of the curing performed after the rubbing treatment is not particularly limited, and the curing is performed by applying appropriate heat or being irradiated with light according to the types of the compound and the initiator or curing agent as applied.

The adhesive layer having the liquid crystal orientation ability as above can be effectively applied for various uses, particularly when the adhesive layer exists adjacent to liquid crystals, so that the orientation of the relevant liquid crystals is required.

For example, it relates to an optical device comprising the adhesive layer of the present application, which comprises: first and second substrates disposed opposite to each other; a liquid crystal layer existing between the first and second substrates; and a cured layer of the curable composition of claim 1 present on the surface, which faces the liquid crystal layer, of any one substrate among the first and second substrates.

Among the optical devices as above, particularly, a typical example of the application in which a layer having liquid crystal orientation ability and adhesion ability is required, as in this application, can be exemplified by an auto-stereoscopic 3D device applying a lens structure such as a lenticular lens.

As illustratively shown in the FIGURE, such a device has a basic unit comprising a lens structure (300), such as a lenticular lens, and a substrate (200), such as a conductive film, attached to one side of the lens structure (300), and liquid crystals injected into a space (500) between the substrate (200) and the lens structure (300), where in the unit, the adhesive layer may be applied as a layer (400) serving to determine orientation of the liquid crystals in the inner space (500) while attaching the substrate (200) to the lens structure (200).

Accordingly, as shown in the FIGURE, the optical device may have a structure in which the lens layer or lens structure (300) is present on the surface, which faces the liquid crystal layer, of any one substrate (100) among the first and second substrates (100, 200), and the lens layer or lens structure (300) and the other substrate (200) are attached by the cured layer (400) of the curable composition.

In the optical device, other configurations rather than the adhesive layer applied according to the present application, for example, the types or materials of the substrate, or the lens layer or the lens structure, and the like are not particularly limited and all the known contents can be applied.

BRIEF DESCRIPTION OF DRAWINGS

The FIGURE is an exemplary unit structure of an auto-stereoscopic 3D display device, which is one example to which the curable composition of the present application can be applied.

ADVANTAGEOUS EFFECTS

The present application relates to a curable composition. The curable composition of the present application exhibits excellent adhesion ability and liquid crystal orientation ability simultaneously before or after curing, so that it can be effectively applied to various optical uses.

MODE FOR INVENTION

Hereinafter, the present application will be described in detail with reference to Examples according to the present application and Comparative Examples not complying with the present application, but the scope of the present application is not limited to the following examples.

1. Rubbing Processability Evaluation

The curable compositions prepared in Examples and Comparative Examples are each coated on an ITO layer of a general ITO film (a film in which ITO (indium tin oxide) is deposited on one side of a PET (poly(ethylene terephthalate)) film) (the substrate (200) of the FIGURE) to a thickness of about 10 μm, dried at a temperature of about 130° C. for about 3 minutes, and then rubbed with a rubbing cloth applied to a normal rubbing orientation. Thereafter, the substrate on which the lens structure is formed (the substrate (100) of the FIGURE on which the lens layer (300) is formed) is attached to the cured layer subjected to the rubbing orientation after the heat treatment, irradiated with ultraviolet rays of about 3 J/cm2 by a metal halide lamp and the liquid crystals are injected into the space (500 in the FIGURE) therebetween, and then it is confirmed whether the liquid crystal orientation has been well formed using a polarizing microscope (Nikon Corporation, ECLIPSE E600WPOL). When the liquid crystal orientation was formed, it was evaluated as P, and when the orientation was not formed or the orientation defect was observed, it was evaluated as NG.

2. Liquid Crystal Orientation Evaluation

The sample applied at the time of evaluating the rubbing orientation is further aged at a temperature of about 50° C. to 100° C. for about 10 minutes to 1 hour, and then it is confirmed whether the liquid crystal orientation has been well formed using a polarizing microscope (Nikon Corporation, ECLIPSE E600WPOL), as in the rubbing processability evaluation. When the liquid crystal orientation was formed, it was evaluated as P, and when the orientation was not formed or the orientation defect was observed, it was evaluated as NG.

3. Lens Attachment Property

The sample applied at the time of evaluating the liquid crystal orientation was bent and unbent, and then the attachment degree of the layer of the curable composition to the lens and the ITO layer was observed, and when there was no abnormality, it was evaluated as P and when the attachment was detached or the defects of the liquid crystal orientation was observed, it was evaluated as NG.

4. ITO Adhesion

The curable compositions prepared in Examples or Comparative Examples were each coated on the ITO layer of the ITO film, irradiated with ultraviolet rays and aged in the same manner as in the rubbing processability evaluation and the liquid crystal orientation evaluation, and subjected to a cross cut test according to ASTM D3359 standard, and when the cured layer was not detached at all, it was evaluated as P and when it was partly or entirely detached, it was evaluated as NG.

Example 1

Epiclon 1055 (bisphenol A type epoxy compound, epoxy equivalent weight: 450 to 500 g/eq; softening point: 64° C. to 74° C.) from DIC Corporation as a solid epoxy compound, YD-128 (liquid bisphenol A type epoxy compound, epoxy equivalent weight: 184 to 190 g/eq) from Kukdo Chemical Co., Ltd. as a liquid epoxy compound, CN110NS (bisphenol A type epoxy acrylate, liquid phase) from Sartomer as a bisphenol type (meth)acrylate, YP-50 (bisphenol A type phenoxy resin, molecular weight: 60,000 to 80,000 g/mol) as a phenoxy resin, Irgacure 184 from BASF as a photo radical initiator and CPI-101A from SAN-APRO as a photo cationic initiator were introduced into a reactor in a weight ratio of about 15:10:15:58:1:1 (Epiclon 1055:YD-128:CN110NS:YP-50:Irgacure 184:CPI-101A), diluted appropriately with methyl ethyl ketone, and then the inside of the reactor was replaced with nitrogen and homogenized to prepare a curable composition. In the case of the curable composition of Example 1, the heat treating (aging) temperature at the time of evaluating physical properties was about 50° C., and the time was about 1 hour.

Examples 2 to 7 and Comparative Examples 1 to 3

A curable composition was prepared in the same manner as in Example 1, except that the kinds and ratios of the components used were changed as shown in Table 1 below.

TABLE 1

|  |  | Example | | | | | | | Comparative Example | | |
|---|---|---|---|---|---|---|---|---|---|---|---|
|  |  | 1 | 2 | 3 | 4 | 5 | 6 | 7 | 1 | 2 | 3 |
| Epoxy compound | Epiclon 1055 | 15 | 25 | 25 | 25 | 25 | 25 | 25 | 25 | 25 | 15 |
|  | YD-128 | 10 | 10 | 20 | 10 | 10 | 10 | 10 | 15 | 20 | 10 |
| (Meth)acrylate | CN110NS | 15 | 15 | 13 | 15 | 15 | 15 | 15 |  |  | 25 |
| Phenoxy resin | YP-50 | 58 | 48 |  | 48 | 48 | 48 | 48 | 58 | 53 | 48 |
|  | YP-70 |  |  | 40 |  |  |  |  |  |  |  |
| Radical initiator | Irgacure 184 | 1 | 1 | 1 | 1 | 1 | 1 | 1 |  | 1 | 1 |
| Cationic initiator | CPI-101A | 1 | 1 | 1 | 1 | 1 | 1 | 1 |  | 1 | 1 |
| Curing agent | C11ZA |  |  |  |  |  |  |  | 2 |  |  |
| Heat treatment | Temperature (° C.) | 50 | 50 | 50 | 50 | 80 | 100 | 100 | 50 | 50 | 50 |
|  | Time (minute) | 60 | 50 | 60 | 60 | 60 | 10 | 60 | 60 | 60 | 60 |

Content unit: part by weight
Epiclon 1055: bisphenol A type epoxy compound, epoxy equivalent weight: 450 to 500 g/eq, softening point: 64° C. to 74° C. (DIC Corporation)
YD-128: liquid bisphenol A type epoxy compound, epoxy equivalent weight: 184 to 190 g/eq, Kukdo Chemical Co., Ltd.
CN110NS: bisphenol A type epoxy acrylate, liquid phase, Sartomer product
YP-50: bisphenol A type phenoxy resin, molecular weight: 60,000 to 80,000 g/mol
YP-70 bisphenol A type phenoxy resin, molecular weight: 50,000 to 60,000 g/mol
Irgacure 184: radical initiator(BASF)
CPI-101A: cationic initiator (SAN-APRO product, liquid phase)
C11ZA: heat curing agent (Shikoku Chemicals Corporation)

The measured evaluation results of Examples and Comparative Examples above are as shown in Table 2 below.

TABLE 2

|  | Example | | | | | | | Comparative Example | | |
|---|---|---|---|---|---|---|---|---|---|---|
|  | 1 | 2 | 3 | 4 | 5 | 6 | 7 | 1 | 2 | 3 |
| Rubbing processability | P | P | P | P | P | P | P | P | P | NG |
| Liquid crystal orientation | P | P | P | P | P | P | P | NG | P | NG |
| Lens attachment property (before ultraviolet irradiation) | P | P | P | P | P | P | P | P | NG | P |
| Lens attachment property (after ultraviolet irradiation) | P | P | P | P | P | P | P | P | NG | NG |
| ITO adhesion | P | P | P | P | P | P | P | P | P | P |

EXPLANATION OF REFERENCE NUMERALS

100, 200: substrate
300: lens structure
400: alignment layer, cured layer of curable composition
500: inner space

The invention claimed is:
1. A curable composition comprising an epoxy compound; a bisphenol type phenoxy resin; and a bisphenol type (meth)acrylate in a ratio of 60 parts by weight or less relative to 100 parts by weight of the epoxy compound,
wherein the epoxy compound comprises a bisphenol type epoxy resin having an epoxy equivalent weight of 350 g/eq or more, and a bisphenol type epoxy resin having an epoxy equivalent weight of 300 g/eq or less, and the bisphenol type epoxy compound having an epoxy equivalent weight of 300 g/eq or less is comprised in a ratio of 40 to 80 parts by weight relative to 100 parts by weight of the bisphenol type epoxy resin having an epoxy equivalent weight of 350 g/eq or more.

2. The curable composition according to claim 1, wherein the bisphenol type (meth)acrylate is a compound having a bisphenol framework to which at least one (meth)acrylic functional group is linked.

3. The curable composition according to claim 1, wherein the bisphenol type (meth)acrylate is represented by Formula 1 below:

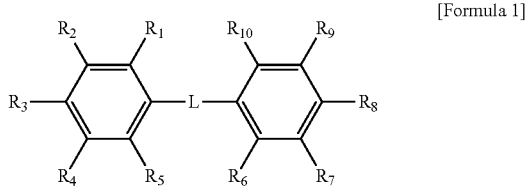

[Formula 1]

wherein, L is an alkylene group or alkylidene group having 1 to 8 carbon atoms, and $R_1$ to $R_{10}$ are each independently hydrogen, halogen, an alkyl group, an alkoxy group, a cyano group, a nitro group, $-(O-A)_n-R$, $-(A-O)_n-R$, $-(O-A-O)_n-R$, a (meth)acryloyl group, a (meth)acryloyloxy group, a (meth)acryloyloxyalkyl group or a (meth)acryloyloxyalkyloxy group, where A is an alkylene group, R is a (meth)acryloyl group or a (meth)acryloyloxy group, n is a number in a range of 1 to 10, and at least one of $R_1$ to $R_{10}$ is $-(O-A)_n-R$, $-(A-O)_n-R$, $-(O-A-O)_n-R$, a (meth)acryloyl group, a (meth)acryloyloxy group, a (meth)acryloyloxyalkyl group or a (meth)acryloyloxyalkyloxy group.

4. The curable composition of claim 1, wherein the bisphenol type phenoxy resin has a weight average molecular weight in a range of 30,000 to 150,000 g/mol.

5. The curable composition according to claim 1, further comprising a cationic initiator.

6. The curable composition of claim 1, further comprising a radical initiator.

7. The curable composition according to claim 1, wherein the epoxy compound is present in the curable composition in a ratio of 10 wt % to 90 wt %.

8. A method for preparing a liquid crystal orientational adhesive layer comprising steps of: coating a layer with the curable composition of claim 1; performing an orientation treatment on the layer; curing the layer on which the orientation treatment has been performed; and heat treating the layer after the curing treatment.

9. The method for preparing a liquid crystal orientational adhesive layer according to claim 8, wherein the heat treatment is performed at a temperature in a range of 50° C. to 100° C.

10. The method for preparing a liquid crystal orientational adhesive layer according to claim 8, wherein the heat treatment is performed for 10 minutes to 60 minutes.

11. An optical device comprising first and second substrates disposed opposite to each other; a liquid crystal layer existing between the first and second substrates; and a cured layer coated with the curable composition of claim 1 on a surface of the second substrate, which faces the liquid crystal layer.

12. The optical device according to claim 11, wherein a lens layer is present on a surface of the first substrate, which faces the liquid crystal layer.

* * * * *